(12) United States Patent
Grant

(10) Patent No.: US 6,875,300 B1
(45) Date of Patent: Apr. 5, 2005

(54) FABRICATION OF VENEER FACED PANELS

(75) Inventor: Michael Charles Grant, Coventry (GB)

(73) Assignee: Jaguar Cars, Limited, Coventry (GB)

( * ) Notice: Subject to any disclaimer, the term of this patent is extended or adjusted under 35 U.S.C. 154(b) by 464 days.

(21) Appl. No.: 10/070,452

(22) PCT Filed: Aug. 30, 2000

(86) PCT No.: PCT/GB00/03337
§ 371 (c)(1), (2), (4) Date: Jul. 15, 2002

(87) PCT Pub. No.: WO01/17822
PCT Pub. Date: Mar. 15, 2001

(30) Foreign Application Priority Data

Sep. 7, 1999 (GB) .............................. 9920979

(51) Int. Cl.[7] .................................. B31F 1/00
(52) U.S. Cl. ................. 156/214; 156/256; 156/267; 156/511; 156/580
(58) Field of Search ................ 156/212, 214, 156/267, 257, 475, 511, 580; 264/256, 241

(56) References Cited

U.S. PATENT DOCUMENTS 2,466,966 A * 4/1949 Prance et al. ............. 156/214
2,482,981 A * 9/1949 Ellis ......................... 428/81

FOREIGN PATENT DOCUMENTS

| DE | 1405184 | * | 1/1969 |
| DE | 4137135 A1 | * | 5/1993 |
| EP | 0325690 A2 | * | 8/1989 |
| FR | 2760208 | * | 9/1998 |
| GB | 1229475 | * | 4/1971 |

* cited by examiner

Primary Examiner—Blaine Copenheaver
Assistant Examiner—Barbara J Musser
(74) Attorney, Agent, or Firm—Raymond L. Coppiellie

(57) ABSTRACT

This invention relates to the fabrication of veneer faced panels (10), in particular veneer faced panels (10) for mounting in the passenger compartment of a motor vehicle. A blank (14) is shaped and trimmed by placing it in a first press (20) having a tool with a flat peripheral pressing surface (30) and then placed in a second press (40) also having a flat peripheral pressing surface (31) following which a layer of veneer (16) is placed over the blank (14) before being pressed against the blank (14), so that a veneered panel (10) is formed with flat and parallel end face (18).

11 Claims, 4 Drawing Sheets

FABRICATION OF VENEER FACED PANELS

This invention relates to the fabrication of veneer faced panels, in particular veneer faced panels for mounting in the passenger compartment of a motor vehicle.

It is sometimes desirable for the visible surface of a decorative panel to be covered with a layer of wood veneer, and for the panel to be mounted over a surface.

If the side faces of the panel are not covered in veneer, it is important to hide those faces from view so that the less attractive substrate material beneath the veneer cannot be seen. One way to achieve this is for the panel to curve towards the surface on which it is to be mounted, so that when the panel is mounted on that surface, the side faces of the panel where the substrate material is exposed are flat and lie flush against the mounting surface.

In a known way of fabricating such panels, the substrate is formed from a pre-cut metal sheet that is pressed to the required three dimensional shape, following which a sheet of veneer is pressed over the metal sheet. The sheet of veneer is chosen to slightly overlap the metal sheet so that the veneer covers the entire visible surface of the panel when the panel is mounted on a surface. However, fabricating veneered panels in this way can result in the veneer having an visibly uneven surface close to the edge of the panel due to the formation of a recess behind the veneer.

U.S. Pat. No. 2,377,664 and British Patent 1,229,475 describe a method of producing a blank suitable for coated with veneer sheet, the method comprising the steps of; shaping and trimming a blank by pressing the blank between an upper tool and lower tool of a press, wherein the lower tool has a lower pressing surface comprising at least two flat peripheral regions, and when the press is closed, the blank is trimmed along at least two edges by the interaction of the upper tool surface and the flat peripheral regions of the lower tool surface, such that the blank forms flat edges each being bounded on one side by a trimmed edge, the flat and faces being substantially parallel with one another, see especially FIGS. 1 to 5, and corresponding description, of U.S. Pat. No. 2,377,664. The patents lack any teaching of the characterising steps of the method as claimed hereafter in claim 1.

According to the present invention, there is provided a method of producing panels with a veneer face, the method comprising the steps of:

a) shaping and trimming a blank by pressing the blank between an upper tool and a lower tool of a first press, wherein the lower tool has a lower pressing surface comprising at least two flat peripheral regions, and when the press is closed, the blank is trimmed along at least two edges by the interaction of the upper tool surface and the flat peripheral regions of the lower tool surface, such that the blank forms flat end faces each being bounded on one side by a trimmed edge, the flat end faces being substantially parallel with one another;

b) removing the blank from the first press and placing it on a lower tool of a second press, the lower tool having a lower pressing surface shaped to receive the blank after it has been pressed, wherein the lower pressing surface comprises at least two flat peripheral regions, such that when the blank is on the lower tool of the second press, the flat end faces of the blank lie against the peripheral regions of the lower pressing surface, the peripheral regions of the lower pressing surface extending beyond the trimmed edge of the blank;

c) superposing a veneer sheet on the blank such that the veneer overlaps at least two trimmed edges of the blank; and, d) pressing the sheet of veneer against the blank by bringing the upper tool and the lower tool of the second press together, wherein the interaction of the upper and lower tool shapes and trims the veneer such that adjacent to at least two trimmed edges of the veneer sheet, the veneer sheet has a flat end face that lies next to and substantially coplanar with a flat end face of the blank.

Fabrication of veneered panels in this way does not involve pre-cutting a blank with the required contour since the blank is cut to shape by the first press at least in part when it is pressed. Furthermore, the veneer sheet is also cut to shape at least in part by the second press when the second press is closed in order to mould the veneer sheet.

The blank will preferably be formed from a pure metal such as aluminium or a metal alloy and for simplicity the invention will hereafter be described in terms of a metal blank.

It will be understood the terms upper and lower tool are used for convenience and to not limit the relative or absolute positions of the tools, so that for example in the case of the first and the second press the respective shape and role of the upper and lower tools could be inverted, but for simplicity the invention will hereinafter be described in terms of a blank placed on the lower tool of a first and second press.

This method conveniently makes use of a flat peripheral region on the lower pressing surface of the first and second press so that the pressed blank and the veneer sheet form flat and substantially co-planar end faces, thereby forming a veneered panel with substantially flat end faces, and reducing the likelihood of a blemish on the visible surface of the veneer sheet due to the formation of a recess beneath the veneer.

The flat peripheral regions will preferably be parallel with one another in each of the first and second press respectively, so that the end faces of the veneered panel are also parallel with each other. This will allow the veneered panel to be mounted with its end faces flush against a flat surface, such that the end faces cannot be seen.

To facilitate the pressing process and the formation of flat end faces of the blank and the veneer sheet, the flat peripheral regions of the first and second press may be orientated so as to be perpendicular to the direction of relative movement between the respective lower and upper tools of the first and second press.

The upper tool of the first and second press may be generally concave, and the respective lower tool may be generally convex, so that the respective lower tool can be received by the respective upper tool when the first or second press is closed.

In the case of the first and second press, the upper tool may have right angled edges formed where the vertical side walls meet with the flat peripheral regions of the lower pressing surface, and the upper tool may have flared edges, so that the right angled edges of lower tool interact with the flared edges of the upper tool and cut the sheet of veneer or metal blank when the upper and lower tools are brought together.

The veneer sheet may comprise a single layer, but preferably the veneer sheet will comprise at least two layers, one of which is a layer of adhesive to be situated next to the metal surface when the veneer is placed over the metal for pressing, in order to increase the adhesion of the veneer to the metal.

To help the adhesive layer to adhere to the metal and help the other layers of veneer to be formed into the required shape, one or both tools of the second press may be heated when the veneer sheet is pressed. One or more tools of the first press may also be heated so as to reduce the rigidity of the metal blank when it is being pressed.

For simplicity, the first and second press may respectively cut the blank and the veneer sheet along two sides only rather than along the entire periphery of the panel. Sheets of metal and veneer may then be dispensed from a roll and pre-cut to the required length before being pressed and formed into veneered panels.

The shaped and trimmed blank from stage a) in the aforementioned method is a commercial item that may be sold and manufactured separately.

Accordingly, a second aspect of the invention provides a shaped and trimmed blank suitable for being coated with a veneer sheet, the blank being shaped and trimmed by pressing the blank between an upper tool and a lower tool of a first press, wherein the lower tool has a lower pressing surface comprising at least two flat peripheral regions, such that when the press is closed, the blank is trimmed along at least two edges by the interaction of the upper tool surface and the flat peripheral regions of the lower tool surface, and the blank forms flat end faces each being bounded on one side by a trimmed edge, the flat end faces being substantially parallel with one another.

The invention will now be further described by way of example, with reference to the accompanying drawings in which.

Figure 1:
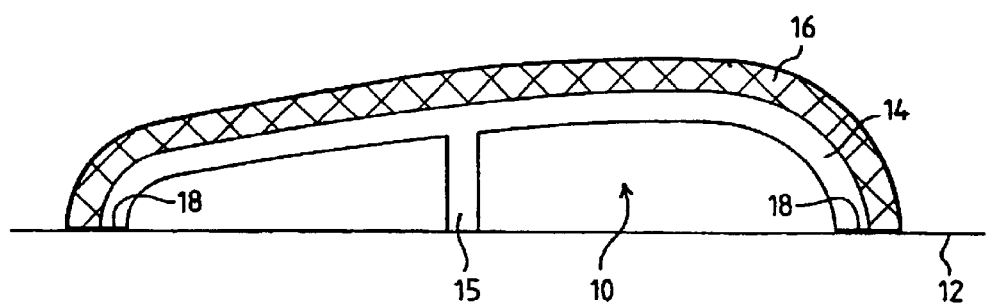
FIG. 1 shows a cross sectional view of a veneered panel according to the invention.

FIG. 1 shows a veneered panel 10 in the finished state mounted over a surface 12. The veneered panel comprises a curved metal sheet 14 having a mounting pillar 15 extending from the inwardly facing surface of the metal sheet 14 so that the veneered panel can be mounted on the surface 12. The mounting pillar can be shaped as a fixing blade or stud and is to be used when attaching the panel to a motor vehicle assembly. The outwardly facing surface of the metal sheet 14 is completely covered with a sheet of wood veneer 16 when viewed in cross section as shown in FIG. 1.

When the veneered panel 10 is mounted on a surface 12, only the outwardly facing side of the panel 10 having the veneer sheet 16 is visible, and the inwardly facing side is hidden from view.

The curvature of the veneered panel 10 increases near the edges of the veneered panel where the panel curves inwardly towards the surface 12 and terminates in flat end faces 18 that lie parallel with one another against the surface 12. In FIG. 1 the end faces 18 lie in the same plane since the surface 12 is flat, but the end faces 18 would lie in different planes if the surface 12 were stepped.

The sheet of veneer 16 extends to the end faces 18 in order to completely cover the metal sheet 14 from view, and so the end faces 18 each consist of an area of metal and an area of veneer.

Figure 2:
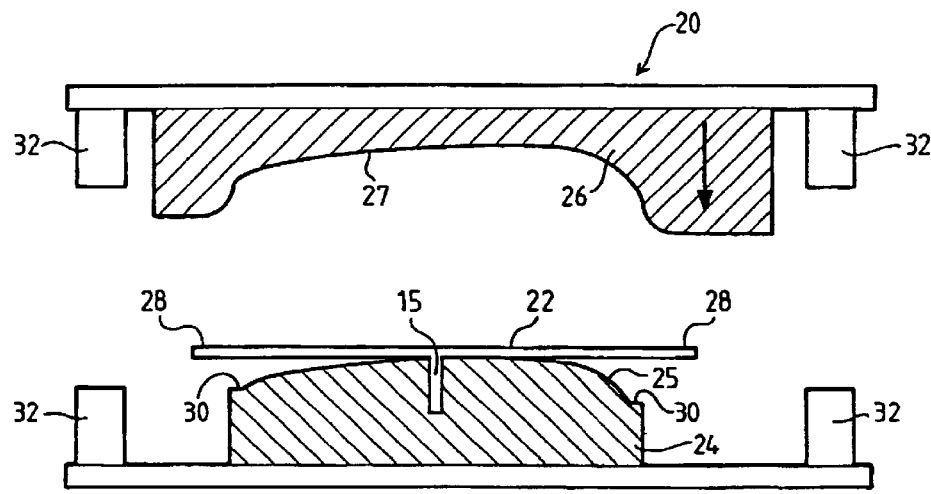
FIG. 2 shows a cross sectional view of a first press in an open position with a metal blank therein.
Figure 3:
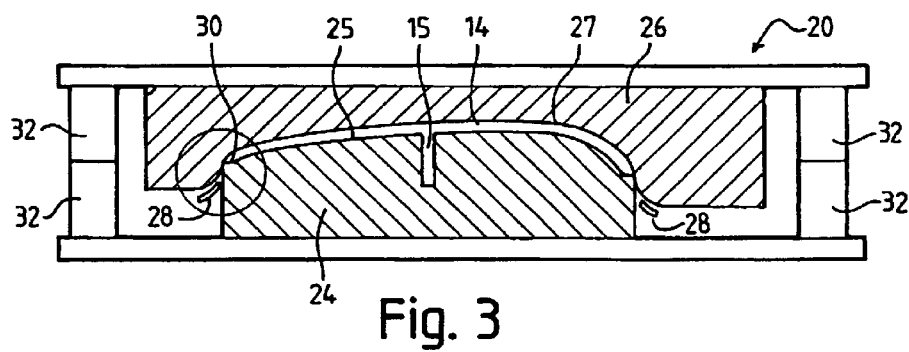
FIG. 3 is a view corresponding to FIG. 1 but showing the first press in a closed position after the metal blank has been pressed.
Figure 4:
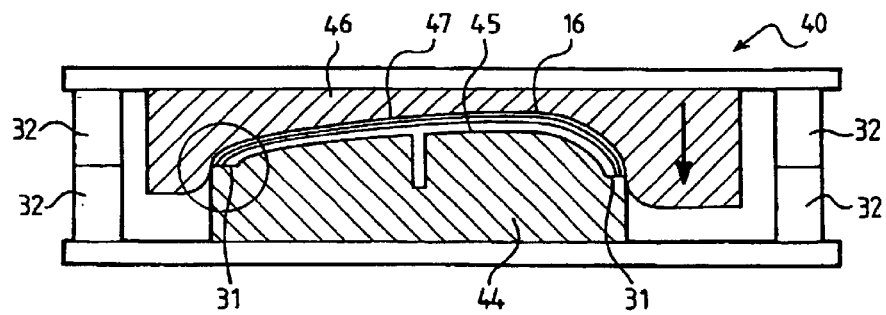
FIG. 4 shows a cross sectional view of a second press in a closed position with a layer of veneer pressed against the metal blank.

Some of the stages involved in the fabrication of a veneered panel of the type shown in FIG. 1 are shown in FIGS. 2 to 4. In the first stage of fabrication, a metal blank 22 is placed in a first press 20, between a lower tool 24 having a lower pressing surface 25 and an upper tool 26 having an upper pressing surface 27, such that the metal blank 22 rests on the pressing surface 25 of the lower tool 24 when the first press 20 is in the open position as shown in FIG. 2. The metal blank 22 is wider than the lower tool 24 in the cross sectional direction of FIG. 2, and so the edge portions 28 of the metal blank 22 overlap the edges of the lower tool 24.

The upper pressing surface 27 is generally concave, and the lower pressing surface 25 is generally convex, so that the lower tool 24 can be received by the upper tool 26 when the upper and lower tools 24,26 are brought together.

The central portions of the upper and lower surfaces 25,27 are complimentary to each other so that when the and lower tools 24,27 are bought together under pressure as shown in FIG. 3, the central region of the metal sheet 22 becomes curved but keeps a uniform thickness.

When viewed in cross section, the side portions of the upper pressing surface 27 curve continuously, whereas the lower pressing surface 25 has flat side portions 30 that are parallel to one another and substantially perpendicular to the direction of relative movement between the lower and upper tools 24,26.

The edge portions 30 each make a right angled corner with the supporting side walls of the lower tool, and when the upper and lower tools 24,26 are brought together, the right angled corners of the lower tool 24 contact the upper pressing surface 27 and cut away the excess metal regions 28 of the blank 22 overlapping the lower tool 24, thereby forming a new metal edge.

Figure 5:
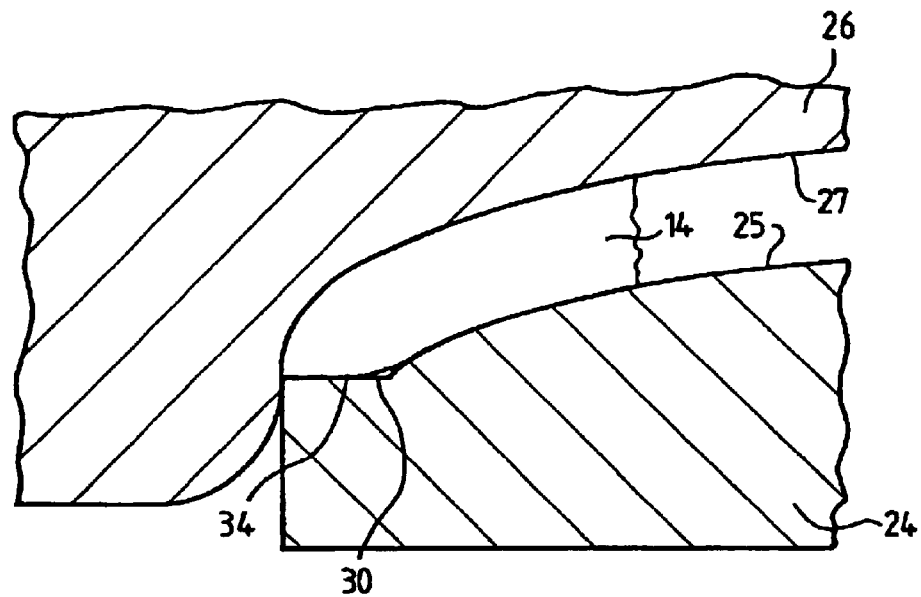
FIG. 5 is an expanded view of the left hand side circled area in FIG. 3.

The force applied by the upper pressing surface 27 and the edge portion 30 of the lower pressing surface 25 has a shearing effect on the metal blank 22 with the result that adjacent to the newly formed edge, when viewed in cross section, the blank forms substantially flat end faces 34 almost parallel with the flat side portions 30 of the lower tool 24 (see FIG. 5). The so formed end faces 34 of the metal blank have approximately the same width as the flat side portions 30 of the lower tool 24, and the angle between the end faces 34 and the flat side portions 30 is typically less than five degrees.

To prevent excessive pressure being applied at the point of contact between the upper and lower tools 24,26, blocks 32 situated remotely from the pressing surfaces 25,27 are provided to bear the force between the tools 24,26 when they are brought into contact.

The blank 22 having been shaped in the way described above now has the shape of the metal sheet 14 shown in FIG. 1 on which the veneer sheet 16 is to be affixed.

The next step is to remove the blank 22 (which will now be referred to as the metal sheet 14) from the first press 20 and place it in a second press 40 having an is upper tool 46 with an upper pressing surface 47 and a lower tool 44 with a lower pressing surface 45.

The lower pressing surface 45 of the second press 40 has the same shape as lower pressing surface 25 of the first press 20 in order to accept the pressed metal sheet 14, but the lower tool 44 has flat side portions 31 that extend beyond the edge of the flat end faces 34 of the metal sheet 14 when the sheet 14 is on the lower tool 44, so that the metal sheet does not completely cover the lower pressing surface 45.

The upper pressing surface 47 of the second press 40 curves continuously in a similar manner to that of the first press 20 but is of increased width to accept the wider lower tool 44 of the second press 40 when the second press 40 is closed.

With the second press 40 in the open position and the metal sheet 14 on the lower tool 44, a sheet of wood veneer 16 is placed over the metal sheet 14. The sheet of wood veneer 16 is initially flat and extends beyond the edge of the lower tool 44. When the press 40 is closed, the sheet of veneer 16 deforms and is pressed against the metal sheet 14 by the upper tool 46 as shown in FIG. 4. The excess veneer extending beyond the lower tool 44 is cut away due to the co-operation between the upper and lower pressing surfaces 45,47 when the press is closed.

In the region between the edge of the lower pressing surface 45 and the edge of the metal sheet 14, the veneer sheet 16 is exposed to the flat side portions of the lower tool 44 and is moulded to form flat end faces 33 adjacent to and substantially parallel with the flat end faces 34 of the metal sheet 14.

The sheet of veneer 16 in the present example comprises two layers; an adhesive under layer 16a that makes contact with the metal sheet 14 and a decorative outer layer 16b. Each layer is typically about 0.5 mm thick.

To melt the resins in the veneer and help the sheet of veneer 16 to deform, the upper and lower tools 44,46 of the second press 40 are heated to about 145 degrees Celsius. The heat applied to the veneer sheet 16 also helps the veneer to stick to the metal 14 surface.

The sheet of metal 14 will normally be made of aluminium or an aluminium rich alloy.

The first and second pressing tools 20,40 as shown in FIGS. 1 to 6 form at two edges of the veneered surface 10, but the pressing tools can be shaped to form the edge all the way around the veneered surface 10.

Figure 7:
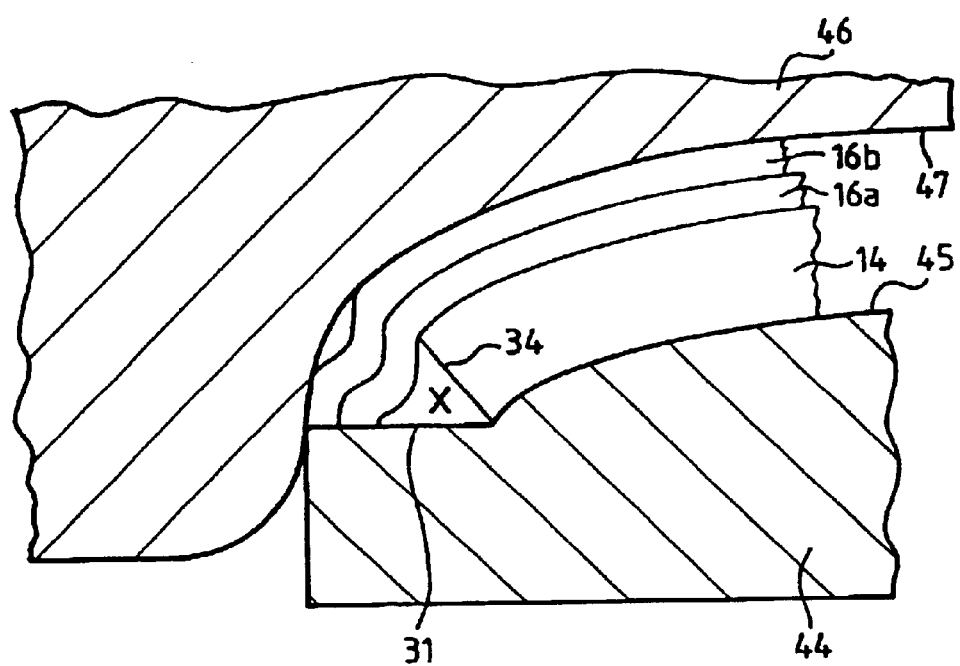
FIG. 7 is a view corresponding to FIG. 6 but showing a metal blank that has not been pinch trimmed.

If a veneered panel 10 is made from a blank 14 that is cut to the two dimensional shape of the panel 10 before the blank 14 is pressed, then once the blank has been pressed into a three dimensional shape, it is possible for the end faces 34 of the pressed blank to be at an angle of about 120 degrees to one another rather than parallel as shown in FIGS. 7 and 8 (parts corresponding to parts in previous figures have been given the same reference numerals).

When a sheet of veneer 16 extending sufficiently beyond the pressed blank so as to cover its end faces 34 is pressed against the blank 14, then this can result in the end faces 18 of the so-formed veneered panel 10 having a recess (marked by a cross in FIG. 7). This recess can cause an adjacent part of the veneer sheet 16 to depart from the smooth shape of the pressing surface upper pressing surface 47, thereby producing a blemish on the visible part of the panel.

Figure 6:
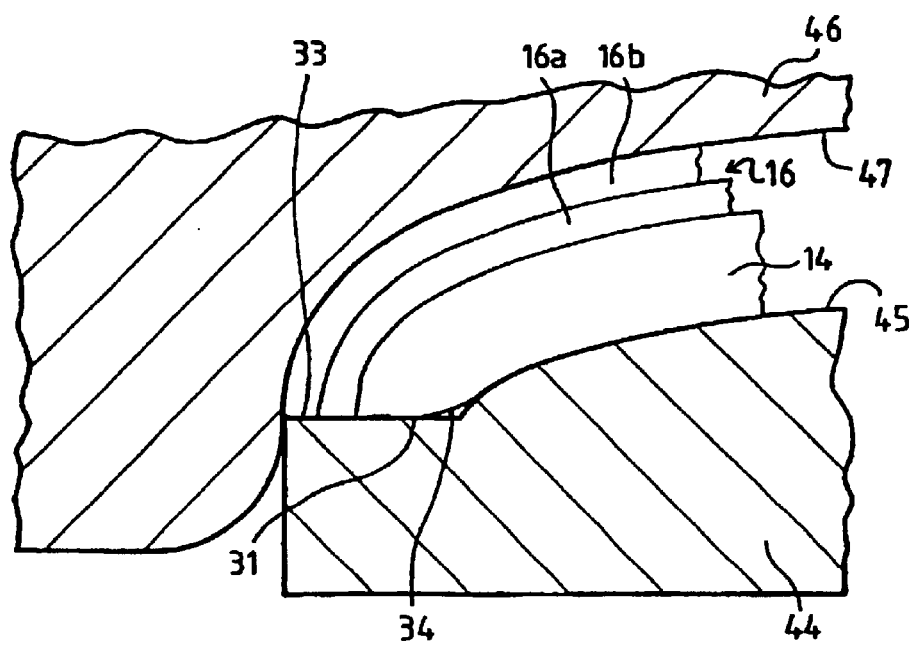
FIG. 6 is an expanded view of the left hand side circled area in FIG. 4.

In contrast, the end faces 18 of the veneered panel fabricated according to the present invention has no substantial recess (the small recess seen in FIGS. 5 and 6 is unimportant), allowing the veneered panel 10 to have a smooth visible surface along its outer edge.

The veneered panel 10 can then be positioned such that the end faces 18 of the panel 10 are flush with the surface on which the panel 10 is mounted.

What is claimed is:

1. A method of producing veneer faced panels, the method comprising the steps of:
    a) shaping and trimming a blank by pressing the blank between an upper tool and a lower tool of a first press, wherein the lower tool has a lower pressing surface comprising at least two flat peripheral regions such that when the press is closed, the blank is trimmed along at least two edges by the interaction of the upper tool surface and the flat peripheral regions of the lower tool surface so as to form flat end faces, each being bounded on one side by a trimmed edge, the flat end faces being substantially parallel with one another;
    b) removing the blank from the first press and placing it on a lower tool of a second press, the lower tool of the second press having a lower pressing surface shaped to receive the blank after it has been pressed, wherein the lower pressing surface comprises at least two flat peripheral regions, such that when the blank is on the lower tool of the second press, the flat end faces of the blank lie against the peripheral regions of the lower pressing surface, the peripheral regions of the lower pressing surface extending beyond the trimmed edge of the blank;
    c) superposing a veneer sheet on the blank such that the veneer overlaps at least two trimmed cycles of the blank; and,
    d) pressing the sheet of veneer against the blank by bringing the upper tool and the lower tool of the second press together, wherein the interaction of the upper and lower tool shapes and trims the veneer such that adjacent to at least two trimmed edges of the veneer sheet, the veneer sheet has a flat end face that lies next to and substantially coplanar with a flat end face of the blank.

2. A method of producing panels as claimed in claim 1, wherein the peripheral regions (30) are parallel with one another in each of the first (20) end second press (40) respectively.

3. A method of producing veneer faced panels as claimed in claim 1, wherein the end faces of the veneered panel are parallel with each other.

4. A method of producing veneer faced panels as claimed in claim 3, wherein the flat peripheral regions of the first and second press are orientated so as to be perpendicular to the direction of relative movement between the respective lower and upper tools of the first and second press.

5. A method of producing veneer faced panels as claimed in claim 1, wherein the upper tools of the first and second press are generally concave, and the respective lower tools are generally convex.

6. A method of producing veneer faced panels as claimed in claim 2, wherein the upper tools of the first and second presses each have right angled edges formed where the vertical side walls meet with the flat peripheral regions of the lower pressing surface, and the upper tool also has flared edges adjacent the right angled edges.

7. A method of producing veneer faced panels as claimed in claim 6, wherein the right angled edges of the lower tool interact with the flared edges of the upper tool and cut the sheet of veneer (16) or metal blank (14) when the upper and lower tools are brought together.

8. A method of producing veneer faced panels as claimed in claim 1, wherein the blank is made from metal.

9. A method of producing veneer faced panels as claimed in claim 1, wherein the veneer sheet comprises at least two layers, one of which is a layer of adhesive to be situated next to the metal surface when the veneer is placed over the metal for pressing.

10. A method of producing veneer faced panels as claimed in claim 1, wherein one or both tools of the first or second press are heated.

11. A method of producing panels as claimed in claim 1, wherein the first and second press respectively cut the blank and the veneer sheet along two sides.

* * * * *